(12) United States Patent
Gerhardinger et al.

(10) Patent No.: US 8,215,007 B2
(45) Date of Patent: Jul. 10, 2012

(54) METHOD OF ASSEMBLING A HEATED INSULATING GLASS PANEL WITH A FITTING

(75) Inventors: Peter F. Gerhardinger, Maumee, OH (US); Dillon R. Ashton, Luckey, OH (US)

(73) Assignee: Engineered Glass Products, LLC, Chicago, IL (US)

( * ) Notice: Subject to any disclaimer, the term of this patent is extended or adjusted under 35 U.S.C. 154(b) by 207 days.

(21) Appl. No.: 12/806,871

(22) Filed: Aug. 23, 2010

(65) Prior Publication Data

US 2010/0325891 A1 Dec. 30, 2010

Related U.S. Application Data

(62) Division of application No. 11/367,163, filed on Mar. 3, 2006, now Pat. No. 7,805,896.

(51) Int. Cl.
*H01R 43/00* (2006.01)
(52) U.S. Cl. ....... 29/825; 29/897.32; 52/204.5; 219/522
(58) Field of Classification Search ............ 29/33 M, 29/825, 842, 843, 897.32; 52/204.5, 287.1, 52/713.1; 174/72 C, 481, 494, 666; 219/203, 219/522
See application file for complete search history.

(56) References Cited

U.S. PATENT DOCUMENTS

| | | | |
|---|---|---|---|
| 1,847,924 A * | 3/1932 | Calderwood | 174/666 |
| 2,155,080 A | 4/1939 | Cornell, Jr. | |
| 2,647,242 A * | 7/1953 | Kutcka | 52/716.1 |
| 2,910,567 A | 10/1959 | Holstein | |
| 3,944,319 A | 3/1976 | Giampa | |
| 4,035,609 A | 7/1977 | Vogel | |
| 4,079,966 A | 3/1978 | Berry et al. | |
| 4,099,319 A | 7/1978 | Vogel | |
| 4,262,913 A | 4/1981 | Parfree et al. | |
| 4,297,565 A | 10/1981 | Parr | |
| 4,496,212 A | 1/1985 | Harvey | |
| 4,593,175 A | 6/1986 | Bowser et al. | |
| 4,613,530 A | 9/1986 | Hood et al. | |
| 4,627,206 A | 12/1986 | Cox | |
| 4,691,486 A | 9/1987 | Niekrasz | |
| 4,692,744 A | 9/1987 | Hickman | |
| 4,707,591 A | 11/1987 | Sprenger | |
| 4,861,969 A | 8/1989 | Kircherer et al. | |
| 5,133,168 A | 7/1992 | Neilley et al. | |
| 5,154,531 A | 10/1992 | Peterson | |
| 5,239,133 A | 8/1993 | Beck et al. | |
| 5,249,403 A | 10/1993 | Neilley et al. | |
| 6,029,783 A | 2/2000 | Wirthlin | |
| 6,144,017 A | 11/2000 | Millett et al. | |
| 6,641,444 B2 | 11/2003 | Hanazaki et al. | |
| 6,808,403 B2 | 10/2004 | Morlesin | |

(Continued)

*Primary Examiner* — Donghai D. Nguyen
(74) *Attorney, Agent, or Firm* — Marshall & Melhorn LLC

(57) ABSTRACT

A heated insulating glass panel, with a fitting, is provided. The heated insulating glass panel is formed from two dielectric sheets that are separated by a spacer, which has a spacer layer at the spacer edge. The fitting, which is made of a fitting base portion and a fitting tubular portion, is attached to the spacer layer at the spacer edge by way of, for example, two screws. Thus, the fitting provides a pathway for routing wires into and away from the heated insulating glass panel. If necessary, an elbow may be provided which attaches to the fitting tubular portion for changing the direction of the routing of the wires. In addition, conduit may be attached to the fitting to route the wiring to and from the heated insulating glass panel.

15 Claims, 5 Drawing Sheets

U.S. PATENT DOCUMENTS

| | | |
|---|---|---|
| 6,874,286 B2 | 4/2005 | Tavivian |
| 6,938,328 B2 | 9/2005 | Mehdianpour et al. |
| 7,265,323 B2 | 9/2007 | Gerhardinger et al. |
| 7,390,572 B2 | 6/2008 | Butz et al. |
| 7,425,369 B2 | 9/2008 | Oakey et al. |
| 2005/0166495 A1 | 8/2005 | Cho et al. |
| 2005/0269312 A1 | 12/2005 | Gerhardinger |

* cited by examiner

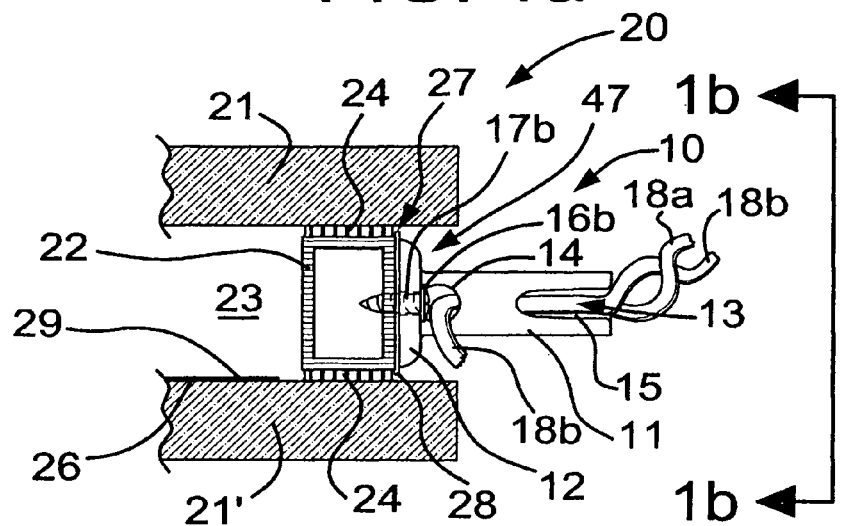
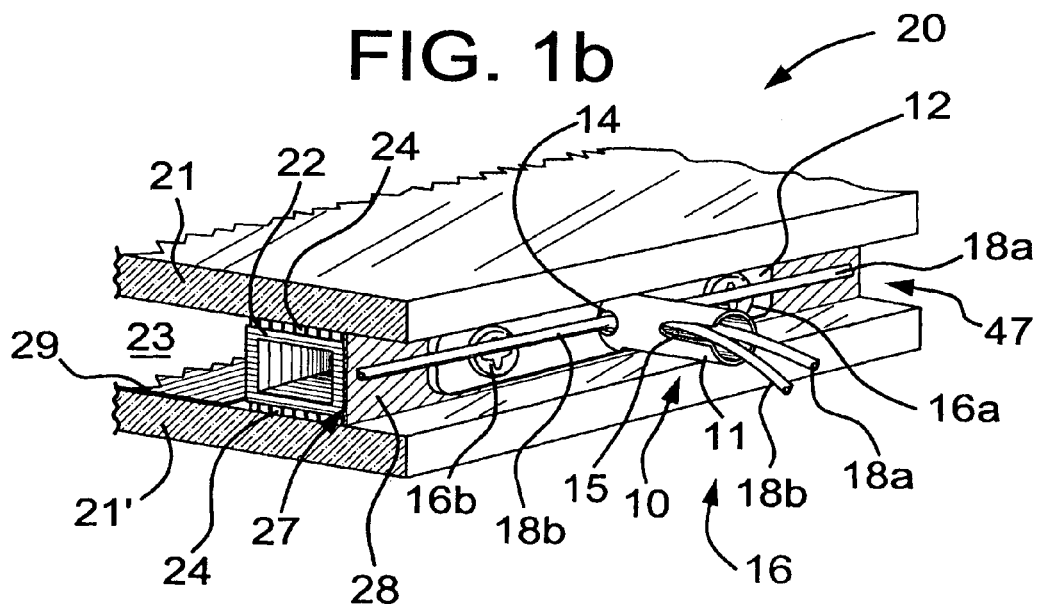

METHOD OF ASSEMBLING A HEATED INSULATING GLASS PANEL WITH A FITTING

RELATED APPLICATIONS

This application is a divisional application of and claims benefit, under 35 U.S.C. §120, of U.S. patent application Ser. No. 11/367,163, filed Mar. 3, 2006, which is now U.S. Pat. No. 7,805,896 issued on Oct. 5, 2010 and is incorporated by reference herein in its entirety.

FIELD OF THE INVENTION

The present invention relates to a heated dielectric unit with a fitting. More particularly, the present invention relates to a heated insulating glass panel having a fitting for routing wires to and from the heated insulating glass panel.

BACKGROUND OF THE INVENTION

Those skilled in the art know that electrical power is utilized to produce heat in dielectric panels (a.k.a., units), for example, insulating glass (IG) panels, that have a conductive thin-film coating disposed thereon. In order to provide the electrical power to such heated dielectric panels, electrical wires are typically connected to bus bars that are disposed on the heated dielectric panels.

Often, electrical wires from, for example, an electrical power source, are routed by pathways, for example, conduit, raceways, and panel frames, to the heated dielectric panels. To safely provide electrical routing and connection to the heated dielectric panels, the National Electrical Code (NEC) and the Underwriters Laboratories (UL) have established performance standards.

UL wiring standards, as they apply to an IG panel, require, for example, that wiring must be protected in a recognized conduit or raceway. The protected wiring and any connectors, through which the protected wiring may be disposed, must withstand 35 pounds of a pulling force for 60 seconds in any direction. Further, the protected wiring must not exceed 6 feet in length and must terminate in an electrical junction box that meets the NEC requirements or standards.

In addition to these UL wiring standards, IG panels are expected to have a spacer edge that is impervious to moisture, thus it is not practical to anchor wiring directly to the spacer edge. It is common that space for channel wiring is limited to ½ inch between the glass panels. Any connectors that are utilized for routing wires need to be compatible with the material make up of sealants and spacers.

The wiring must be capable of entering and leaving the space between the IG units and anywhere along the IG unit, with the exception of the lower horizontal panel edge, known as a panel sill. When entering or leaving the space between the IG units, the wiring must be capable of extending directly away or tangentially away from the IG unit, while taking up a minimum of space. No matter how the wiring is routed, it is necessary for the manufactured IG unit to maintain the spacer's seal integrity.

Thus, a fitting that is capable of meeting at least the above-stated requirements has been sought.

SUMMARY OF THE INVENTION

The present invention relates to an insulating dielectric panel that comprises at least two dielectric sheets that are parallel to and spaced apart from one another, with a spacer disposed therebetween. The spacer has a spacer edge where a fitting is disposed thereon. The fitting is comprised of a fitting tubular portion that is disposed on a fitting base portion. The fitting is capable of routing wires therein. An extension, capable of routing the wires at a chosen angle that is commonly known to those skilled in the art as an "elbow", may be disposed on an end of the tubular portion that is opposite the base portion.

Further advantages of the present invention will be apparent from the following description and appended claims, reference being made to the accompanying drawings forming a part of a specification, wherein like reference characters designate corresponding parts of several views.

BRIEF DESCRIPTION OF THE DRAWINGS

FIG. 1a is a cross-sectional view of an insulating dielectric panel with a first fitting disposed thereon in accordance with the present invention;

FIG. 1b is a three dimensional view, in the direction of the line 1b-1b, of FIG. 1a;

DETAILED DESCRIPTION OF THE INVENTION

Figure 1C:
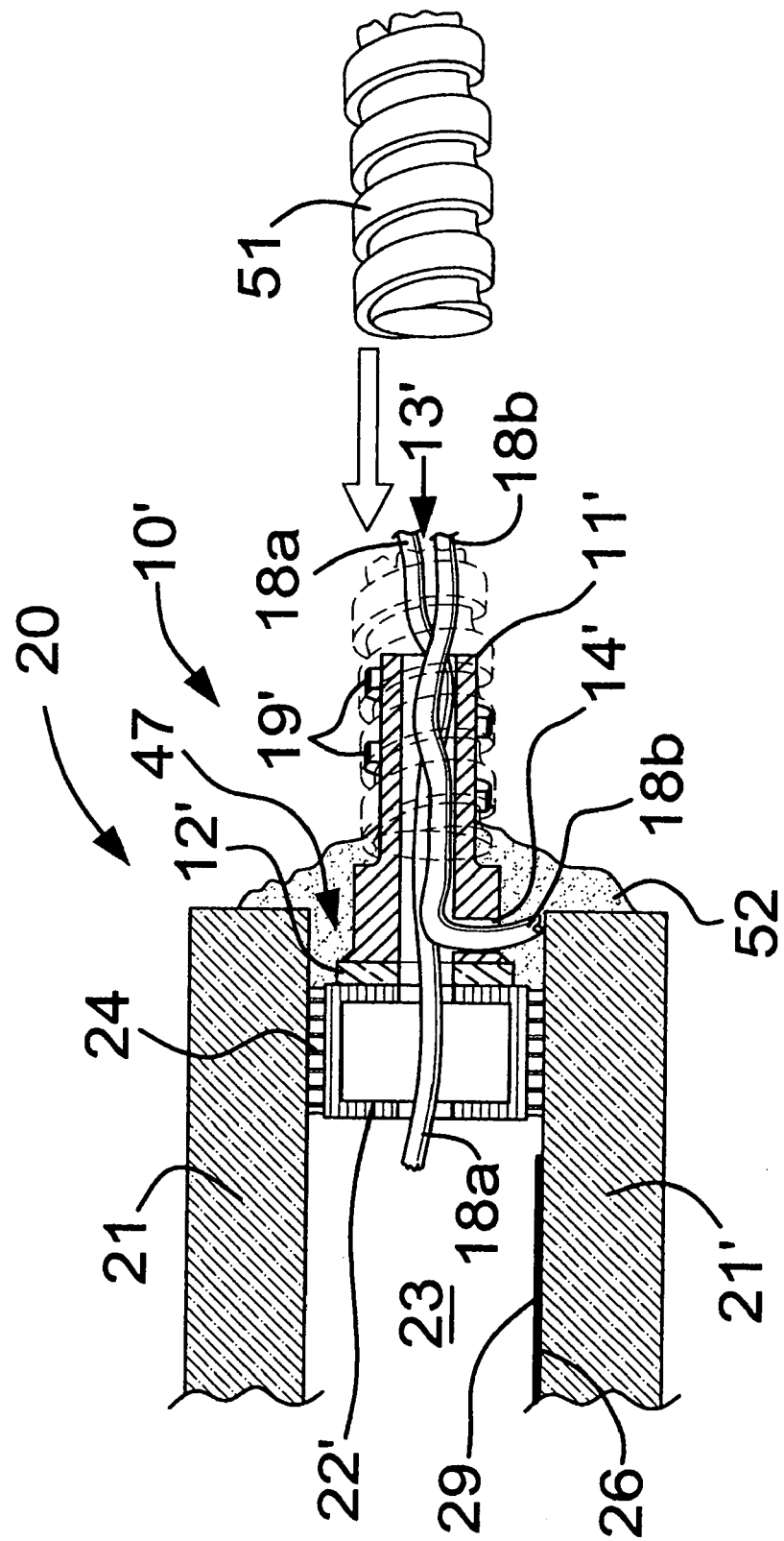
FIG. 1c is a cross-sectional view of the insulating dielectric panel with a second fitting disposed thereon in accordance with the present invention.

FIG. 1a illustrates a first fitting 10 disposed on an insulating dielectric panel 20. The first fitting 10 is shown having a first fitting tubular portion 11 and a first fitting base portion 12. The first fitting tubular portion 11 is shown disposed, for example, in a substantially perpendicular fashion, at one end onto the first fitting base portion 12.

However, it is within the spirit and scope of the present invention that the first fitting tubular portion 11 may extend away from the first fitting base portion 12 at various angles. As illustrated throughout, fitting tubular portions 11,11' (see, for example, FIGS. 1c, 3 for two separate views of the second fitting tubular portion 11') have a generally circular cross-section, but it is within the spirit and scope of the present invention that the fitting tubular portions 11,11' may have other cross-sectional shapes, for example, rectangular and triangular.

As further illustrated in FIG. 1a, the first fitting tubular portion 11 has a first fitting bore 13 therethrough, with at least one radially oriented first fitting tubular hole 14 that connects to the first fitting bore 13, and with at least one optional fitting slot 15. Wires 18a,b are shown being routed through a pathway that comprises the first fitting bore 13 and then through the first fitting tubular hole 14.

The first fitting tubular portion 11 may be integrally formed (for example, of die cast metal, of molded plastic, or into a machined metal part) with the first fitting base portion 12, which has at least one attachment means 16 (for example, a screw 16b, whose threads 17b are shown as hidden items, a rivet, or an adhesive), which are known in the art, to secure the first fitting 10 onto the insulating dielectric unit 20.

The insulating dielectric unit 20 has at least two dielectric sheets 21, 21', which are in a parallel arrangement with one another, with a spacer 22 disposed therebetween. A space (or gap) 23 between the sheets 21,21' may be evacuated of air or the space 23 may have a rare gas disposed therein. The spacer 22 is shown with a primary sealant 24 disposed between the spacer 22 and the sheets 21,21', near the perimeter of the insulating dielectric unit 20. A recess 47 may be formed at the perimeter of the insulating dielectric unit 20, by the way in which the spacer 22 and the sheets 21,21' are disposed. As such, the recess 47 may be utilized as a pathway for routing the wires 18*a,b* on the outside of the insulating dielectric unit 20.

The spacers 22,22' may, for example, comprise a plastic, a rubber compound, a metal, or combinations thereof, and the spacers 22,22' may, for example, be solid or tubular. Spacer holes that are utilized for wire passage into the space 23 may have hole inserts (not shown), which are common in the art, for reducing chaffing of wires 18*a,b*. The cross-section of the spacers 22,22' may, for example, be rectangular (as shown) or tapered (not shown). Desiccant, which is not shown, but which is common in the art, may be disposed within hollow spacers 22,22' to absorb moisture within the insulating dielectric panel 20.

The spacers 22,22' have a spacer edge 27, where a spacer layer 28 is formed or disposed thereon. It is a discovery of the present invention that the spacer layer 28, for example, a metal layer, has been found to cooperate with the fitting base portions 12,12' and the attachment means 16 (like screws 16*a,b*) to allow the fittings 10,10' to meet a UL 35 pound pull test on the wires 18*a,b* for 60 seconds or less in any direction, and, consequently, on the fittings 10,10'.

Hence, if a pulling force (i.e., in a direction away from the fittings 10,10') of 35 pounds or less is communicated to one or each of the wires 18*a,b* for 60 seconds or less in any direction, then the wires 18*a,b* will remain in electrical communication with a conductive coating 29 (for example, a chemical vapor deposition (CVD) coating), which is disposed on a major interior surface 26 of the dielectric sheet 21'. In addition, the fittings 10,10' will remain attached to the spacer layer 28, which may be, for example, a metal layer disposed on the exterior of a plastic or a rubber spacer 22,22' or is the metal spacer 22,22' itself.

Note that one or both of the wires 18*a,b* may be routed through a pathway that comprises the bores 13,13', which, in addition to extending through the tubular portions 11,11', may also extend through holes in the base portions 12,12' and through holes in the spacer 22' (shown in FIG. 1*c*, but the spacer 22' could also be utilized with the first fitting 10 as shown in FIGS. 1*a,b*). The slot 15 may be utilized to route the wires 18*a,b* in a direction that is tangential to the edge 27 of the spacers 22,22'.

Figure 4:
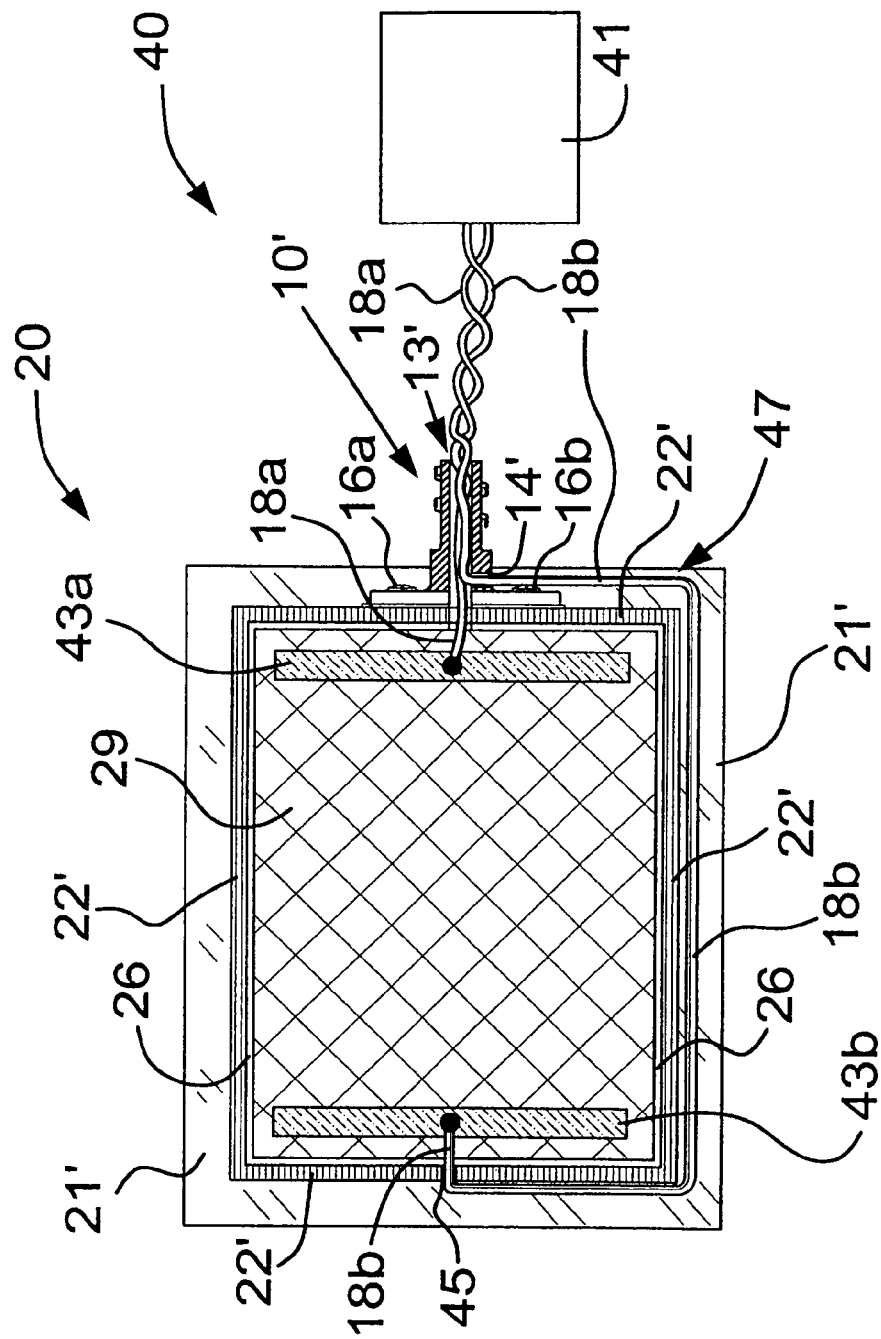
FIG. 4 is an electrical schematic in accordance with the present invention.
Figure 5:
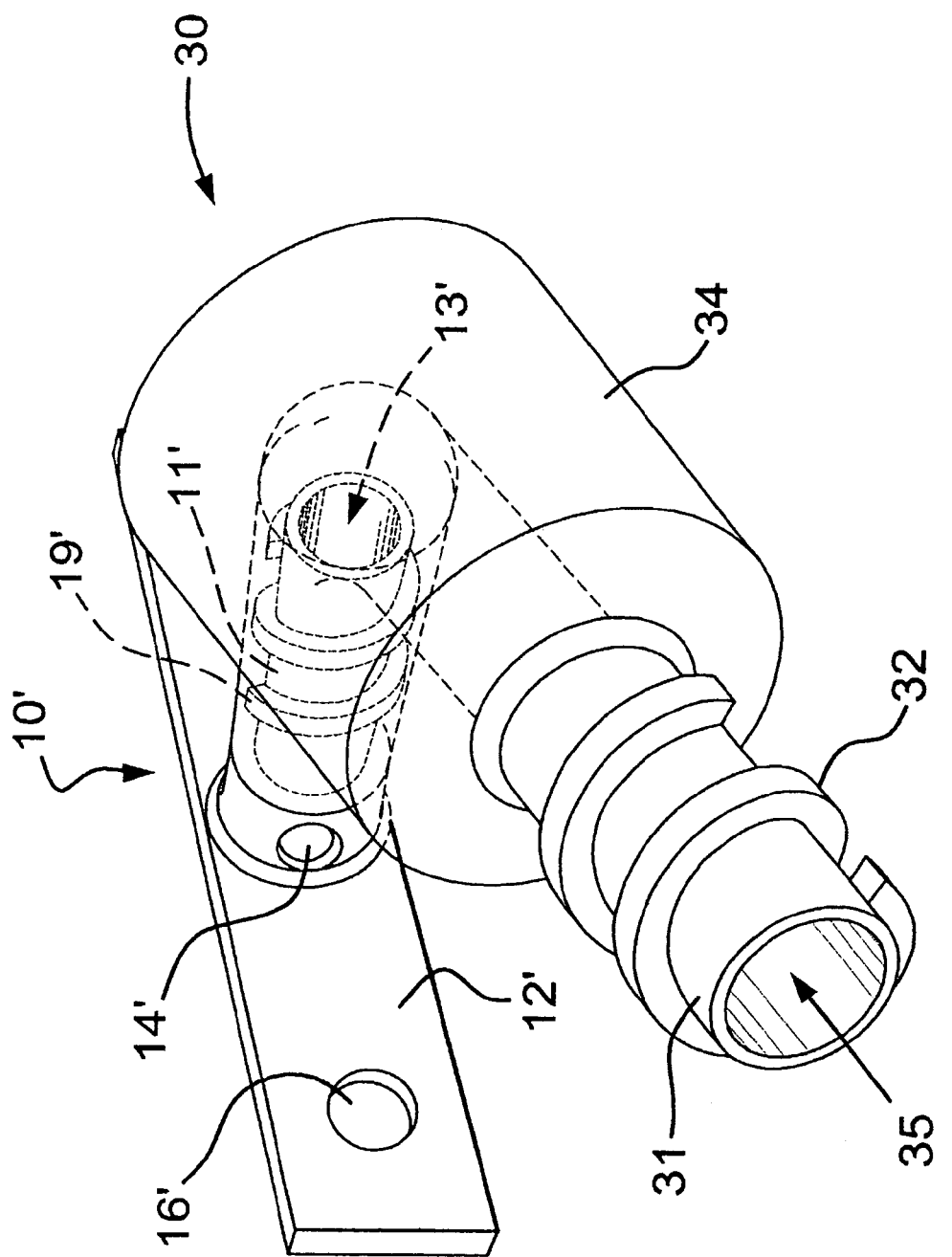
FIG. 5 is a three dimensional view of the connecting of the elbow of FIG. 2 with the second fitting of FIG. 1c.

As depicted in FIG. 4, the wire 18*a* could be connected to a bus bar 43*a* via the bore 13' and into the space 23 (see, for example, FIG. 1*c*), where the wire 18*a* is disposed onto the first bus bar 43*a* (or indirectly, exteriorly to tabs on the bus bars 43, not shown). On the other hand, the wire 18*b* could exit the fitting 10' by way of tubular hole 14' and be routed in the recess 47 between the two dielectric sheets 21,21' to an opposite side of the insulating dielectric panel 20.

As shown on the left side of the insulating dielectric panel 20 in FIG. 4, the wire 18*b* could be disposed through a hole 45 (that may have an insert therethrough) that is disposed through the spacer 22'. Upon entering the space 23, the wire 18*b* is disposed onto the second bus bar 43*b*, thus the wires 18*a,b* are electrically connected across a portion of the conductive coating 29. When electricity is communicated (via an electrical source of power 41), by way of wires 18*a,b*, to the conductive coating 29, heat is generated by the insulating dielectric unit 20.

The dielectric sheets 21,21' may comprise glass, ceramic, or glass-ceramic. The conductive coating 29 may comprise a doped metal oxide, like tin oxide doped with fluorine, which could be disposed with a thickness that is one micron or less. The dielectric sheets 21,21' may be transparent, opaque, or translucent.

FIG. 1*b* is a three dimensional view, in the direction of line 1*b*-1*b* of FIG. 1*a*, where both screws 16*a,b* and wires 18*a,b* are further illustrated. The insulating dielectric panels 20, as so constructed, may be utilized, as a heated dielectric panel assembly (see U.S. Application Publication No. 2003/0127452, which is incorporated herein by reference) in, for example, architectural, commercial, automotive, and appliance applications, to name just a few.

FIG. 4 is an electrical schematic of the present invention, where one insulating dielectric unit 20 is shown connected in an electrical circuit 40. It is, however, within the spirit and scope of the present invention that multiple insulating dielectric units 20 could be connected to the electrical source of power 41, in much the same manner as the insulating dielectric unit 20 of FIG. 4.

Although not shown, the electrical power to the bus bars 43*a,b* may be controlled by a microprocessor that may utilize a triac or other solid state switching device. The microprocessor and the triac or other solid state switching device may be disposed, for example, in the recess 47, a frame, a wire chase, or the like, of the insulating dielectric units 20. The disposal and control of these devices are disclosed in U.S. patent application Ser. No. 11/200,724 that was filed Aug. 10, 2005, which is incorporated herein by reference.

The conductive thin film 29 may also comprise a conductive metal oxide that has low emissivity (low-E) properties, which consequently would radiate most of the heat from the coating 29 into the dielectric sheet 21' and then away from the dielectric sheet 21' (i.e., down in FIG. 1*a*), to heat objects and people by way of radiation or to heat air by way of convection. Thus, little heat would be directed toward the space 23 or into the dielectric sheet 21.

It is also a discovery of the instant invention that the fittings 10,10' are capable of allowing the wiring 18*a,b* to enter and leave the space 23 between two insulating dielectric units 20 and along the insulating dielectric units 20, while taking up a minimum amount of that space, for example, ½ inch in width, and yet maintain the spacer's seal integrity. When the wiring 18*a,b* is routed in the recess 47 of the insulating dielectric units 20, a secondary sealant 52 may be disposed in the recess 47 to properly seal and safely contain the wires 18*a,b*, as illustrated in FIG. 1*c*.

Figure 2:
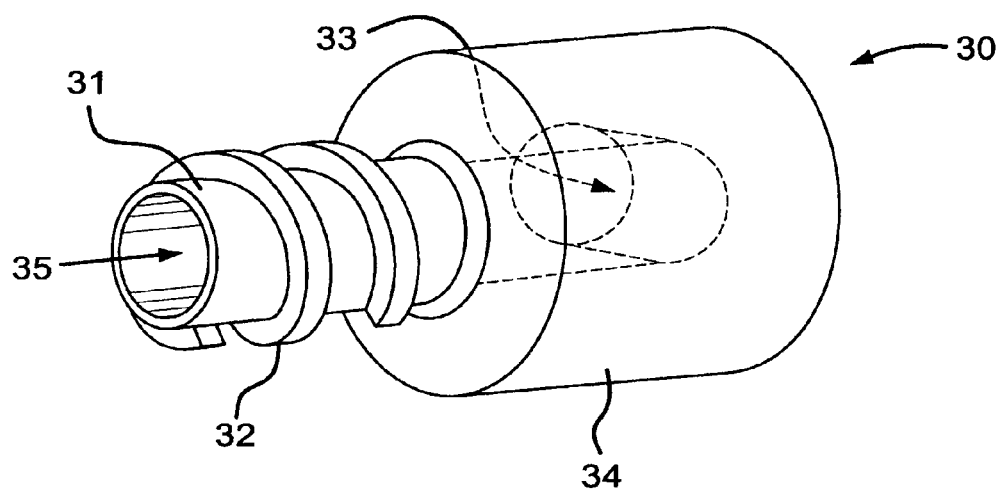
FIG. 2 is a three dimensional view of an elbow in accordance with the present invention.

FIG. 2 depicts an elbow 30 having an elbow body 34 with an elbow tubular portion 31 disposed thereon. The elbow tubular portion 31 has male elbow tubular threads 32 disposed thereon and an elbow tubular bore 35 disposed therethrough. In addition, the elbow tubular bore 35 extends within the elbow body 34 to a junction with an elbow body bore 33, which are illustrated as being circular in cross-section. Although threads 19' and 32 are shown throughout as male threads, it is within the spirit and scope of the present invention that the threads 19' and 32 could be female, wherein mating parts would have male threads.

In addition, the elbow body bore 33 is shown as being disposed substantially perpendicular to the elbow tubular bore 35. However, the bore 33 may have other cross-sectional shapes, for example, rectangular and triangular, and could be disposed at angles other than 90 degrees to the bore 35, and still remain within the spirit and scope of the present invention.

The elbow 30 may be utilized in conjunction with the first fitting 10 of FIGS. 1a,b, where the first fitting tubular portion 11 would cooperate (e.g., in intimate contact) with the elbow body bore 33 to form a wire pathway through the bores 13, 33, 35 for the wires 18a,b. As a result, the wires 18a,b would be tangentially (i.e., with respect to the spacer edge 27) received by the elbow 30 at the elbow bore 35, and then redirected at a more perpendicular orientation toward the spacer edge 27 by way of the bores 13 and 33. The wires 18a,b may exit the first fitting tubular portion 11 via the first fitting tubular holes 14 or continue on through holes in the fitting base 12 and the spacer 22', as mentioned above with regard to FIG. 1c.

The elbow threads 32 (shown as male) are utilized to cooperate with conduit 51 (common in the art and shown in FIG. 1c) having mating (shown as female) threads, for example, 5/16 inch flexible conduit through which the wires 18a,b may be routed. Typically, it is sufficient to utilize two or three turns on the threads 19',32 of the respective threaded parts 10',30, in order to provide an adequate retention force between the threads 19',32 and the inner mating (female) threads of the conduit 51. It is within the spirit and scope of the present invention that the first fitting 10 may be utilizes without the use of any conduit or without the use of the mating conduit 51.

Figure 3:
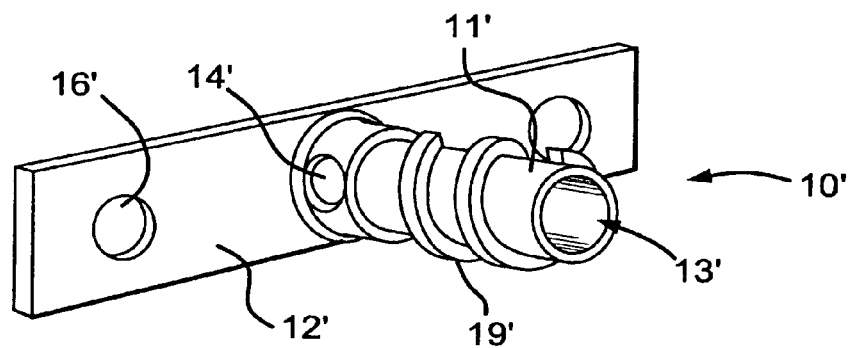
FIG. 3 is a three dimensional view of the second fitting of FIG. 1c.

FIG. 3 illustrates a second fitting 10' that is an alternate embodiment of, and yet much the same as, the fitting 10 of FIGS. 1a,b. The second fitting 10' comprises a second fitting tubular portion 11' and a second fitting base portion 12', where the second fitting tubular portion 11' is disposed, for example, in a substantially perpendicular fashion, at one end onto the second fitting base portion 12'. However, it is within the spirit and scope of the present invention that the second fitting tubular portion 11' may extend away from the second fitting base portion 12' at various angles.

Also shown in FIG. 3 are optional attachment means holes, like base hole 16', that allow, for example, the attachment screws 16a,b to cooperate with the spacer layer 28 for disposing the second fitting base portion 12' onto the spacer 22' (or 22). A second fitting tubular bore 13' allows wires 18a,b to be routed into and out of at least one second fitting tubular hole 14', or the second tubular bore 13' may continue through the second base portion 12' and, thus allow the wires 18a,b to be routed through the spacer 22', as mentioned above.

The second fitting 10' at least varies from the first fitting 10 in that the second fitting 10' has the tubular threads 19' disposed on an exterior surface of the fitting tubular portion 11', as illustrated in FIG. 3. The threads 19' (shown as male in shape) are utilized to cooperate with the mating threads that are formed within the conduit 51, like the 5/16 inch flexible conduit mentioned above, through which the wires 18a,b may be routed. It is known that the 5/16 inch conduit is sufficient to contain two #16 AWG (American Wire Gauge) wires.

FIG. 1c shows an embodiment of the present invention utilizing the second fitting 10' where the second bore 13' extends through the second tubular portion 11', through the second base portion 12', and then through a second spacer 22'. In FIG. 1c the wire 18a is shown extending into the space 23 between the dielectric sheets 21,21', where it could then be disposed onto one of the bus bars 43a or 43b.

Also shown in FIG. 1c is the cooperation between the conduit 51 (in hidden form) and the threads 19' of the second fitting 10'. Wire 18b exits the second fitting 10' by way of the second fitting tubular hole 14'.

After the fittings 10,10' are initially disposed on the insulating dielectric panel 20 (by way of, for example, double faced adhesive tape or a small quantity of adhesive), the screws 16a,b are tightened to mount the fitting 10,10' to the panel 20, and then the wires 18a,b are routed through the bores 13, 13', 33, 35, the holes 14, 14', the panel edge 27, and/or the recess 47. Next, the conduit 51 may be secured to the threads 19' and then the secondary sealant 52 may be disposed over the base portions 12 or 12' of the respective fittings 10 or 10', the wires 18a and/or 18b, the panel edge 27, the recess 47, and/or possibly portions of the conduit 51. When the secondary sealant 52 has cured, the wires 18a,b can be further routed into the conduit 51 and then the conduit 51 can be tightened to the second fitting 10'.

When utilizing the elbow 30, the first fitting 10 may be utilized in place of the second fitting 10', wherein the tubular portion 11 is pressed tightly (via intimate contact) into the elbow bore 33, an elbow set screw and an elbow set screw hole (neither of which are shown but which are common in the art) are utilized to secure the elbow 30 to the first tubular portion 11 of the first fitting 10. Next, the wires 18a,b are routed through the elbow bores 33,35 and the elbow 30 is tightened by way of the threads 32 to the conduit 51. Then the secondary sealant 52 may be disposed in much the same manner as noted above.

It is within the spirit and scope of the present invention that the elbow 30 could be formed without the threads 32 and that no conduit or conduit other than the flexible conduit 51 (e.g., without mating threads) could be utilized.

At an end of the conduit 51 (which is opposite the insulating dielectric unit 20), with the wires 18a,b routed therein, may be terminated in, for example, a threaded adaptor (not shown, but common in the art) that would allow the conduit 51 to be disposed in a standard NEC junction box (not shown, but also common in the art).

Thus, the present invention efficiently, safely, and water tightly routes, via the inventive fittings 10,10', electrical wiring 18a,b, for heated insulating dielectric panels 20, which are connected to electrical power service 41 and panel terminations, like 43a,b. This is achieved while meeting UL and NEC performance standards.

In accordance with the provisions of the patent statutes, the principles and modes of operation of this invention have been described and illustrated in its preferred embodiments. However, it must be understood that the invention may be practiced otherwise than specifically explained and illustrated without departing from its spirit or scope.

What is claimed is:

1. A method, comprising:
   disposing a base with connected tubular fitting on an edge of a spacer of a heated insulating dielectric panel, the spacer forming a space between a pair of dielectric sheets, the spacer edge being external to an internal space between the dielectric sheets, the fitting having at least one radially oriented hole and a fitting axial bore therethrough, and the fitting axial bore disposed away from the external spacer edge; and
   routing at least two wires through the fitting axial bore and routing at least one wire through the radial hole.

2. The method of claim 1, further comprising disposing each of two wires into electrical communication with a corresponding separate bus bar and communicating a pulling force of thirty-five pounds on the wires for sixty seconds or less in any direction, wherein the fitting is capable of maintaining a position on the spacer layer and each wire remains in electrical communications with the corresponding separate bus bar.

3. The method of claim 2, wherein the spacer has a spacer hole therein, the spacer hole being aligned with the fitting axial bore, thus allowing at least one wire to be further routed into the space between the dielectric sheets of the heated insulating dielectric panel.

4. The method of claim 1, further comprising disposing an elbow on the fitting, the elbow having a void therethrough, wherein the wires are further routed through the elbow.

5. The method of claim 1, further comprising disposing the fitting axial bore in a perpendicular relationship to the external spacer edge.

6. The method of claim 1, wherein the external spacer edge comprises a spacer layer disposed thereon, the spacer layer cooperating with attachment means to dispose the fitting base portion on the spacer.

7. The method of claim 6, wherein the spacer layer comprises a metal and the attachment means comprises at least one screw, at least one rivet, or an adhesive.

8. The method of claim 1, wherein the fitting comprises cast metal, machined metal, or plastic.

9. The method of claim 1, wherein one of the two dielectric sheets has an electrically conductive doped metal oxide thin film coating disposed on a surface that is adjacent to the space between the sheets.

10. The method of claim 9, wherein the thin film coating is one micron or less in thickness.

11. The method of claim 9, wherein the thin film coating comprises a low emissivity coating.

12. The method of claim 1, wherein the fitting axial bore forms a fitting tubular portion that comprises a slot.

13. The method of claim 1, wherein the heated insulating dielectric panel comprises an architectural panel assembly, a commercial panel assembly, an automotive panel assembly, or an appliance panel assembly.

14. The method of claim 1, wherein the fitting axial bore of the tubular fitting has a circular, rectangular, or triangular cross-section.

15. The method of claim 1, wherein the tubular fitting is integrally formed with the base comprising die cast metal, molded plastic, or machined metal.

* * * * *